Nov. 16, 1965 A. MACOVSKI 3,218,386

COLOR TELEVISION LUMINANCE CHANNEL DELAY LINE

Filed Sept. 14, 1954 2 Sheets-Sheet 1

INVENTOR.
ALBERT MACOVSKI
BY [signature]
ATTORNEY

INVENTOR.
ALBERT MACOVSKI
BY
ATTORNEY 3,218,386
Patented Nov. 16, 1965

3,218,386

COLOR TELEVISION LUMINANCE CHANNEL DELAY LINE

Albert Macovski, Massapequa, N.Y., assignor to Radio Corporation of America, a corporation of Delaware Filed Sept. 14, 1954, Ser. No. 455,854
4 Claims. (Cl. 178—5.4)

This invention relates generally to color television receivers, and more particularly to novel, improved and simplified circuitry for the luminance channel of a color television receiver.

In a receiver for a subcarrier type color television signal which accords with the color television broadcast standards set by the FCC, it is conventional to provide separate amplifying channels for the luminance signal component and the chrominance signal component (the modulated color subcarrier) of the detected composite color picture signal. In the usual luminance channel, several A.-C. coupled stages are employed, requiring provision for some means of D.-C. restoration after amplification and prior to application of signals to the image reproducing device. The present invention is concerned with a simple single-stage D.-C. coupled luminance channel and associated circuitry for use in a color television receiver.

Since the chrominance channel of the usual color television receiver involves the use of bandpass filters and other delay-imparting circuit components in the derivation of color-difference signals from the modulated color subcarrier, it is requisite that the delay introduced in the chrominance channel be balanced by the introduction of a comparable amount of delay in the luminance channel.

In accordance with the principles of the present invention, the requisite luminance channel delay is introduced by inserting a delay line in the coupling between the output of the receiver's second detector and the input electrode of the single-stage luminance amplifier. The delay line is terminated at both sending and receiving ends to minimize the possibility of occurrence of undesired reflections. Placement of the delay line in the coupling between the detector and the luminance amplifier input readily permits proper termination of both ends of the delay line without unduly restricting the gain attainable in the single-stage luminance amplifier. In accordance with embodiments of the present invention, the luminance signal detector forms the delay line sending end termination, or at least a portion thereof. An excellent luminance signal response is thus obtained, with termination of the line's receiving end also in an end section appropriately matching the delay line surge impedance.

In accordance with one embodiment of the invention, a chrominance signal take-off is provided at the sending end of the luminance channel delay line. In accordance with another embodiment of the present invention, the chrominance signal take-off is across a parallel resonant circuit, tuned to a frequency in the chroma passband, the tuned circuit being connected in series with the input to the video detector. With the tuned circuit impedance high as compared to the delay line input impedance for frequencies in the chroma passband, most of the chrominance signal appears across the tuned circuit and is substantially independent of delay line mistermination. In another embodiment of the present invention, where the color receiver is provided with separate luminance and chrominance signal detectors, the delay line circuitry is effectively isolated from the chrominance channel input and has substantially no effect thereon.

It will thus be appreciated that embodiments of the present invention are concerned with a simple color television receiver luminance channel, provided with simple and effective means for imparting the requisite delay to the luminance signal.

Accordingly it is a primary object of the present invention to provide a novel, improved and simplified color television receiver.

It is also an object of the present invention to provide a novel, improved and simplified color television receiver luminance channel.

It is a further object of the present invention to provide a color television receiver luminance channel with novel, simple and effective means for imparting delay to the luminance signals.

Other objects and advantages of the present invention will be more readily apparent to those skilled in the art after consideration of the following detailed description and an inspection of the accompanying drawings in which.

Figures 1, 3:
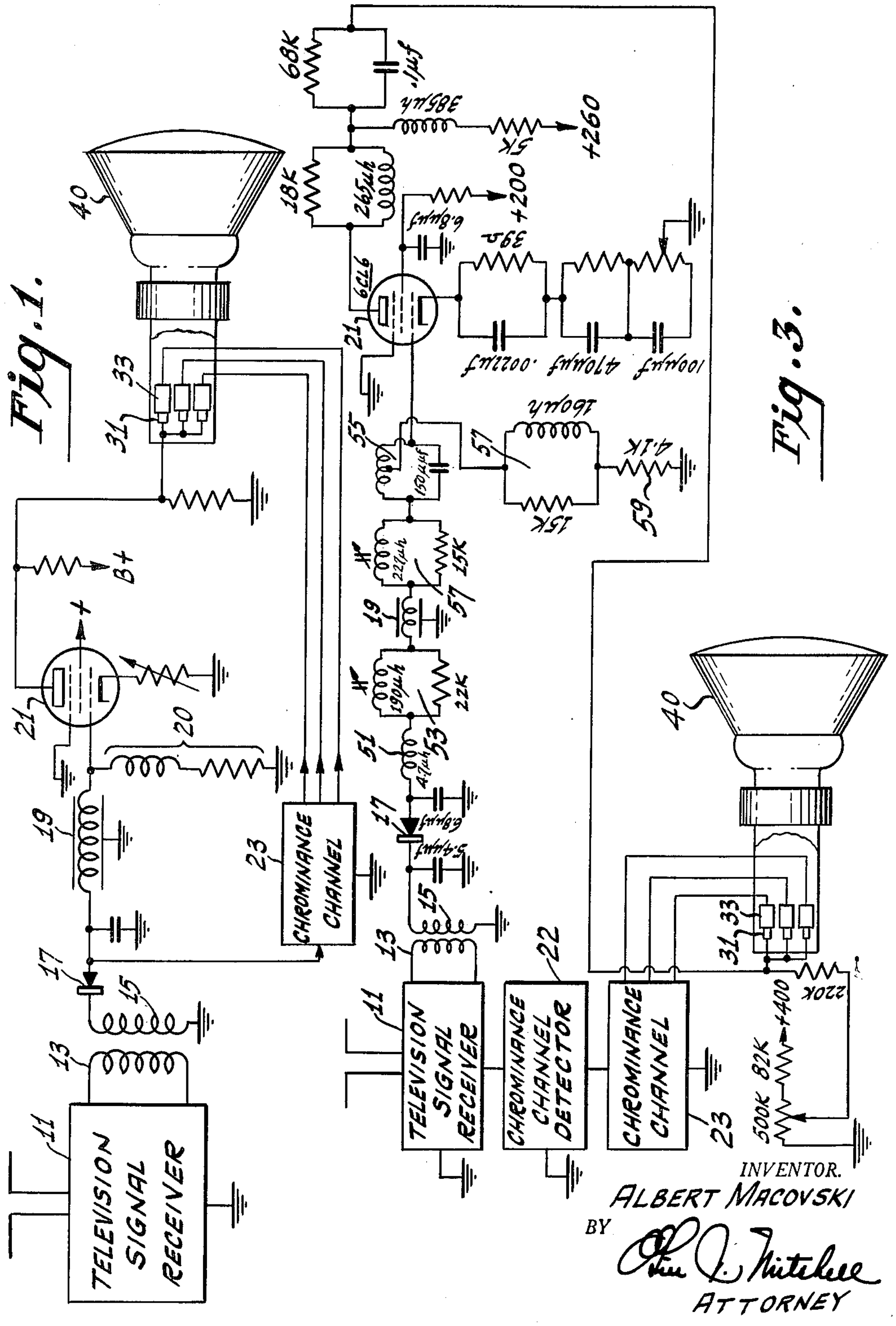
FIGURE 1 illustrates in block and schematic form a color television receiver incorporating a luminance channel in accordance with an embodiment of the present invention.
FIGURE 3 illustrates another modification of the receiver of FIGURE 1 in accordance with a further embodiment of the present invention.

In FIGURE 1, a representative type color television receiver for use in receiving and utilizing color television signals broadcast in accordance with the FCC standards is illustrated. The illustrated receiver includes conventional head-end apparatus 11, which may include the usual RF amplifier, frequency converter, and IF amplifier, for example. The IF signal output of apparatus 11 is illustrated as appearing across the primary winding 13 of a final IF transformer. The secondary winding 15 of the transformer is connected between a point of reference potential (i.e., ground in the illustrative embodiment) and the input electrode of the receiver's second detector 17. The output electrode of detector 17 is directly connected to the sending end of the luminance channel delay line 19, and the receiving end of the delay line 19 is directly connected to the control grid of a luminance amplifier, pentode 21. The anode of luminance amplifier 21 is directly connected to the cathodes 31 of a tri-color kinescope 40, which may be of the general three-gun shadow-mask type, discussed in some detail in an article by H. B. Law entitled, "A Three-Gun Shadow-Mask Kinescope," appearing in the October 1951 issue of the Proceedings of the I.R.E.

The sending end of the delay line 19 is also illustrated as serving as a signal take-off point for the receiver's chrominance channel 23. The apparatus used in chrominance channel 23 has not been illustrated in detail since it is not believed that a showing of such details is necessary for an understanding of the present invention. However, reference may be made to such publications as the June 1953 issue of the RCA Review, and particularly to articles therein, such as the Brown-Luck article entitled, "Principles and Development of Color Television Systems," the Pritchard-Rhodes article entitled, "Color Television Signal Receiver Demodulators," etc., for an understanding of typical apparatus suitable for use in the operations of the chrominance channel 23. The outputs of the chrominance channel 23, comprising respective red, blue and green color-difference signals, are applied respectively to the control grids 33 of the kinescope's "red," "blue" and "green" guns. It will thus be seen that each of the three individual electron beams of the kinescope 40 is modulated in accordance with a respective component color signal appropriate to the color phosphor areas struck by that beam in the normal raster scanning operation of the kinescope.

Returning to a consideration of the luminance signal path, it will be observed that the receiver employs a simple, single stage, D.-C. coupled luminance channel. The output of the second detector 17 is D.-C. coupled to the control grid of the single luminance amplifier 21, and the output of this amplifier is directly coupled to the kinescope cathodes 31. Thus, it will be appreciated that no provision need be made in the luminance channel for the usual D.-C. restoration.

It may also be noted that the delay means, required in the luminance channel to balance the delay imparted to the chrominance information in the filtering and demodulating operations, et al. of the chrominance channel 23, is provided in the coupling between the output of the second detector 17 and the input of the single luminance amplifier 21. The receiving end of the delay line 19 is illustrated as terminated by an LR and section 20, appropriately matching the surge impedance of the delay line 19. In the particularly simple embodiment of the invention under present discussion, the second detector 17 forms the sending end termination of the delay line 19. As a practical example, the detector 17 may be chosen to present a driving impedance of approximately 2800 ohms to a commercially available 2800-ohm surge impedance delay line. In practice, an excellent luminance signal response has been obtained with the detector driving impedance and the delay line surge impedance at this value, and with the receiving end section 20 of corresponding impedance magnitude.

Figure 2:
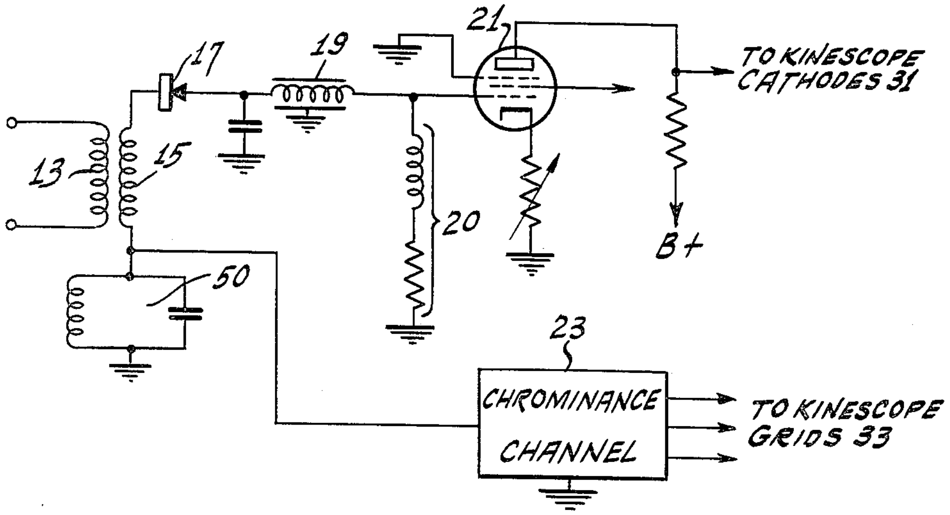
FIGURE 2 illustrates a modification of the receiver of FIGURE 1 in accordance with another embodiment of the present invention.

In FIGURE 2 a modification of the circuits of FIGURE 1 is illustrated in which a tank circuit 50 is shown as included in the coupling of the IF transformer secondary winding 15 to ground. The tuned circuit 50 may be tuned either to the frequency of the color subcarrier bearing the chrominance information, or to some other predetermined frequency in the chroma passband. By making the impedance of the tuned circuit 50 high as compared to the delay line input impedance for signal frequencies in the chroma passband, most of the chroma signal (i.e., the color subcarrier and its sidebands) will appear across the tuned circuit 50, and will be essentially independent of any delay line mistermination. Thus, in FIGURE 2 the input to the chrominance channel 23 is illustrated as being taken across the tuned circuit 50. The tuned circuit 50 may, if desired, serve as a component of a stagger-tuned bandpass chroma signal amplifier of the chrominance 23.

In FIGURE 3 a particular embodiment of the present invention which has proved highly satisfactory in operation is illustrated schematically. The television receiver head-end apparatus 11 and illustrative final IF transformer 13–15 are again shown as supplying IF signals to a video detector 17. The control grid of the single luminance amplifier 21 is again D.-C. coupled to the output of detector 17, and the anode of luminance amplifier 21 is also D.-C. coupled to the cathodes 31 of the color kinescope 40. Again, the luminance channel delay line 19 is inserted in the coupling of the detector 17 output to the luminance amplifier 21 input, and is terminated at both ends thereof by appropriate surge impedance-matching end sections.

In contrast with the embodiments previously discussed, a parallel LR semi-termination 53 is included in the luminance signal path between the output electrode of detector 17 and the sending end of the delay line 19. This luminance signal path is also illustrated as including an IF isolation choke 51. It will be appreciated that the purpose of the choke 51 is to prevent passage of IF components appearing in the output of detector 17 to other sections of the receiver.

Included in the coupling between the receiving end of the delay line 19 and the luminance amplifier input is a trap circuit 55, tuned to the frequency of the color subcarrier (approximately 3.58 mcs.), which is included to attenuate the chrominance carrier so as to minimize the possibility of superimposing a visible 3.58 mc. dot pattern upon the color image reproduction. The receiving end termination for delay line 19 essentially comprises a terminating resistor 59, substantially matching the surge impedance of delay line 19, and a peaking parallel-LR combination 57 provided in series with the terminating resistor 59 and insuring that the receiving end termination appears resistive at all signal frequencies.

The receiver of FIGURE 3 is illustrated as provided with a separate chrominance channel detector 22 for supplying the chrominance signal to the chrominance channel 23. Again, the details of chrominance channel 23 have not been illustrated, the channel including suitable apparatus for deriving respective color-difference signals from the modulated color sub-carrier component of the composite color picture signal. The color-difference signal outputs of the chrominance channel 23 are applied to respective grids 33 of the kinescope 40 for respective combined effects with the common luminance signal on the individual beams of the color kinescope. It will be noted that in this figure and the preceding figures a number of the details of circuitry and components usually associated with a color kinescope of the shadow-mask type, and other conventional circuits of a color television receiver, have not been shown for purposes of simplifying the drawing. It is believed that a complete understanding of the principles of the present invention may be readily achieved without the specific consideration of such details in the present description. It should also be appreciated that certain details, such as the final IF transformer 13–15, have been shown to place apparatus embodying principles of the present invention in a conventional setting. Such means for coupling the IF output of receiver apparatus 11 to the detector 17 is intended however to be illustrative only, and it will be understood that other forms of IF coupling networks may be employed in feeding signals to the detector without departing from the principles of the present invention. It should also be understood that the values of capacitance, inductance, resistance, voltage, etc., indicated on the drawing for the circuit details of FIGURE 3, are given by way of example, and practice of the present invention is in no way restricted to the use of such values.

There have thus been described embodiments of the present invention relating to a single-stage, D.-C. coupled luminance channel for a color television receiver, in which the requisite delay of luminance signals is imparted by delay means located in the D.-C. coupling path extending from the output of the luminance signal detector to the input of the luminance amplifier. A significant advantage to such practice of the present invention resides in the fact that location of the luminance delay line in this coupling path readily permits proper termination of the delay line at both ends, whereby reflections and other mistermination effects may be substantially eliminated, without thereby unduly restricting the gain attainable in the single luminance amplifying stage. A novel and simplified luminance channel, having satisfactory gain and delay characteristics is thus provided.

Having thus described the invention, what is claimed is:

1. In a color television receiver including a video modulated carrier source and a chrominance signal channel, the combination comprising a video detector coupled to said source, a single stage video amplifier having an input terminal and an output terminal, a color image reproducer having a luminance signal input terminal, a D.-C. coupling path including a delay line of predetermined length direct-current conductively connected between said video detector and said video amplifier input terminal, said delay line having a length to impart a delay to signal information from said source to provide a delay between said source and said luminance signal input terminal which substantially equals the delay in said chrominance signal channel, a sending end termination and a receiving end termination for said delay line, each of said terminations substantially matching the surge impedance of said delay line, said sending end termination essentially consisting of said video detector, and a D.-C. coupling path between said video amplifier output terminal and said color image reproducer input terminal.

2. A luminance-signal circuit for a color television receiver comprising a circuit for delaying luminance signals a predetermined period of time including a signal delay line having input and output circuits, means terminating said output circuit with an impedance substantially equal to the impedance of said delay line, a video signal amplifier coupled to said output circuit, and a signal detector connected directly to said input circuit and having an impedance substantially matching the terminating impedance of said delay line, said detector being essentially the sole terminating impedance for said input circuit.

3. A luminance-signal circuit for a color television receiver comprising a circuit for delaying luminance signals a predetermined period of time including a signal delay line having input and output circuits, means terminating said output circuit with an impedance substantially equal to the impedance of said delay line, a video signal amplifier directly connected to said output circuit, and a diode detector directly connected to said input circuit and having an impedance substantially matching the terminating impedance of said delay line, said diode detector being essentially the sole terminating impedance for said input circuit.

4. A luminance-signal circuit for a color television receiver comprising a luminance signal channel which includes a source of signal voltage, a crystal detector coupled in series with said source, a signal delay line having input and output circuits for delaying a signal between said circuits, said input circuit being directly connected to said source and said detector, the impedances of said crystal detector and source substantially matching the terminating impedance of said delay line and essentially being the sole terminating impedance for the input circuit thereof, an output matching impedance directly coupled to said output circuit for terminating the output circuit of said delay line, and a luminance signal amplifier coupled to said output circuit for amplifying the delayed signal derived from said line.

References Cited by the Examiner

UNITED STATES PATENTS

| | | | |
|---|---|---|---|
| 2,577,868 | 12/1951 | Wissel | 178—7.5 |
| 2,715,154 | 8/1955 | Loughren | 178—5.4 |
| 2,734,940 | 2/1956 | Loughlin | 178—5.4 |
| 2,754,356 | 7/1956 | Espenlaub | 178—5.4 |
| 2,759,993 | 8/1956 | Loughlin | 178—5.4 |
| 2,763,716 | 9/1956 | Farr | 178—5.4 |
| 3,042,873 | 7/1962 | Smith | 178—5.4 X |

OTHER REFERENCES

Television for Radiomen, by E. M. Noll, The MacMillan Co., 1949, page 127.

"Compatible Color TV Receiver," Electronics Magazine, January 1953, page 98.

Electronics Magazine: January 1953, pp. 99–104.

DAVID G. REDINBAUGH, *Primary Examiner.*

NEWTON LOVEWELL, STEPHEN W. CAPELLI, *Examiners.*